(12) United States Patent
Rietsch, Jr. et al.

(10) Patent No.: US 9,389,114 B2
(45) Date of Patent: Jul. 12, 2016

(54) CAR WASH CHEMICAL SOLUTION LEVEL MONITORING SYSTEM

(71) Applicants: Gilbert J. Rietsch, Jr., Clarkston, MI (US); Norbert Gattinger, Sterling Heights, MI (US)

(72) Inventors: Gilbert J. Rietsch, Jr., Clarkston, MI (US); Norbert Gattinger, Sterling Heights, MI (US)

( * ) Notice: Subject to any disclaimer, the term of this patent is extended or adjusted under 35 U.S.C. 154(b) by 22 days.

(21) Appl. No.: 14/295,376

(22) Filed: Jun. 4, 2014

(65) Prior Publication Data

US 2015/0002301 A1 Jan. 1, 2015

Related U.S. Application Data

(60) Provisional application No. 61/839,520, filed on Jun. 26, 2013.

(51) Int. Cl.
*G08B 21/00* (2006.01)
*G01F 23/296* (2006.01)
*B60S 3/00* (2006.01)

(52) U.S. Cl.
CPC ........ *G01F 23/2967* (2013.01); *G01F 23/2962* (2013.01); *B60S 3/00* (2013.01)

(58) Field of Classification Search
CPC ... G01F 23/0076; G01F 23/74; G01F 23/284; G01F 23/296; G01F 23/2845; G01F 23/2962
USPC ......................................................... 340/621
See application file for complete search history.

(56) References Cited

U.S. PATENT DOCUMENTS

| | | | |
|---|---|---|---|
| 4,785,664 A | 11/1988 | Reebs | |
| 4,964,090 A | 10/1990 | McCarthy | |
| 5,309,763 A * | 5/1994 | Sinclair | G01F 23/2961 181/124 |
| 6,047,598 A * | 4/2000 | Otto | G01F 23/284 340/621 |
| 6,192,752 B1 * | 2/2001 | Blaine | G01F 23/284 73/290 R |
| 6,662,649 B1 | 12/2003 | Knight et al. | |
| 6,871,103 B2 | 3/2005 | van Kessel | |
| 6,988,406 B1 * | 1/2006 | Mack | G01F 23/74 73/305 |
| 7,243,539 B2 | 7/2007 | Otto et al. | |
| 7,277,020 B2 * | 10/2007 | McCarthy | G01F 23/2962 340/621 |
| 7,342,504 B2 | 3/2008 | Crane et al. | |
| 8,248,252 B2 | 8/2012 | Schechter et al. | |
| 2006/0201245 A1 * | 9/2006 | Huber | G01F 23/003 73/290 R |
| 2009/0183564 A1 * | 7/2009 | Kotz | G01F 23/2961 73/290 V |
| 2009/0229359 A1 * | 9/2009 | Reimelt | G01F 23/284 73/304 R |
| 2009/0303059 A1 * | 12/2009 | Von Lintzgy | G01F 23/2962 340/621 |
| 2014/0159743 A1 * | 6/2014 | Dayal | G01F 23/284 324/649 |
| 2014/0338444 A1 * | 11/2014 | Jaeger | G01F 23/2962 73/290 V |

FOREIGN PATENT DOCUMENTS

JP     EP 0833134 A2 *   4/1998   ............ G01F 23/284

* cited by examiner

*Primary Examiner* — John A Tweel, Jr.
*Assistant Examiner* — Adnan Aziz
(74) *Attorney, Agent, or Firm* — John R. Benefiel

(57) ABSTRACT

A sensor probe for monitoring levels of chemical solutions used in automatic car washes, the sensor probes comprising an elongated sensor probe tube able to be installed by being inserted into a hole in the top of storage drums. A sealed enclosure mounted to the top of the tube is thereby positioned above the associated tank, which enclosure contains a liquid level sensor and a wireless receiver/transmitter able to send data to a computer/display/and web server.

15 Claims, 7 Drawing Sheets

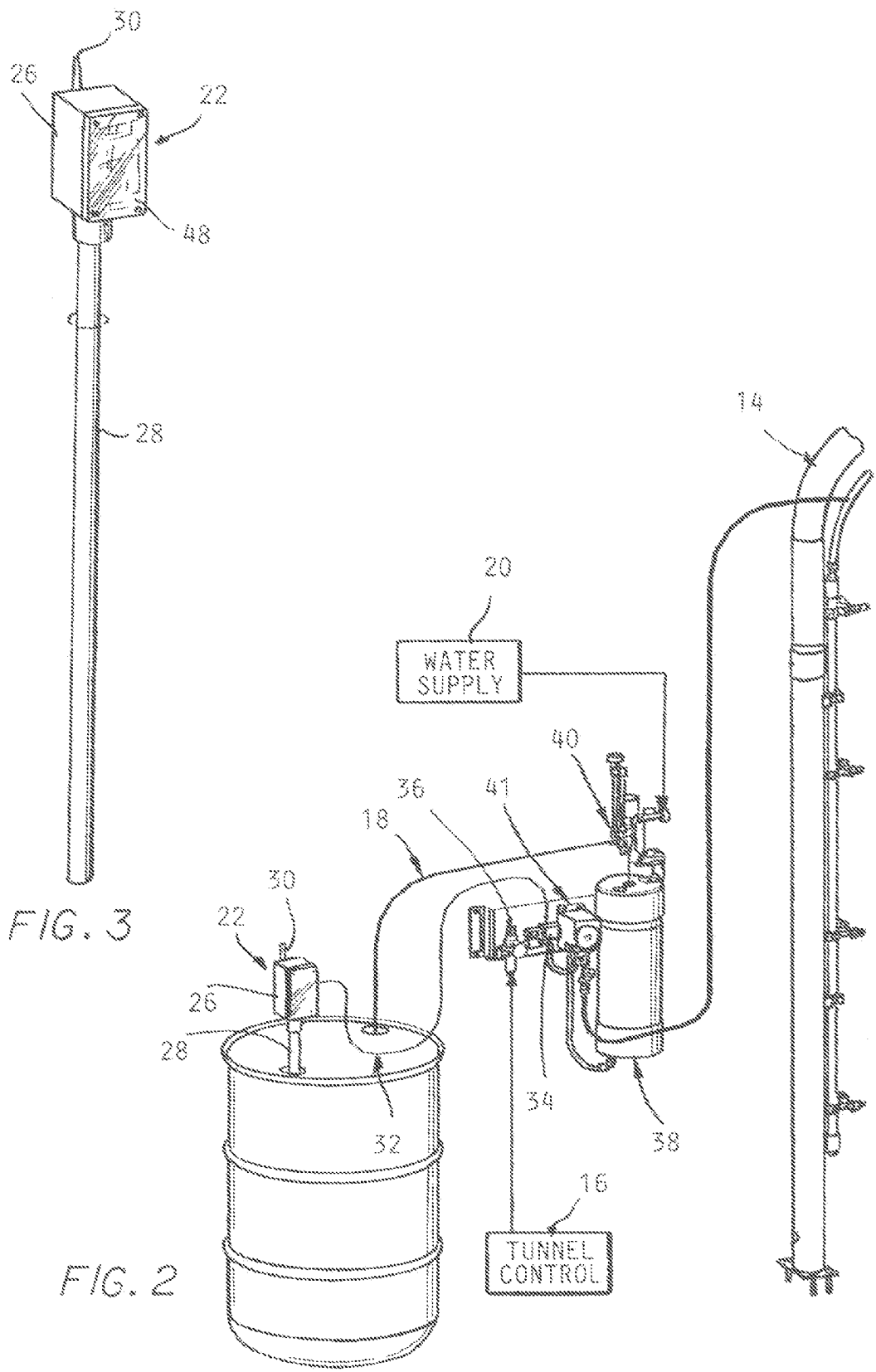

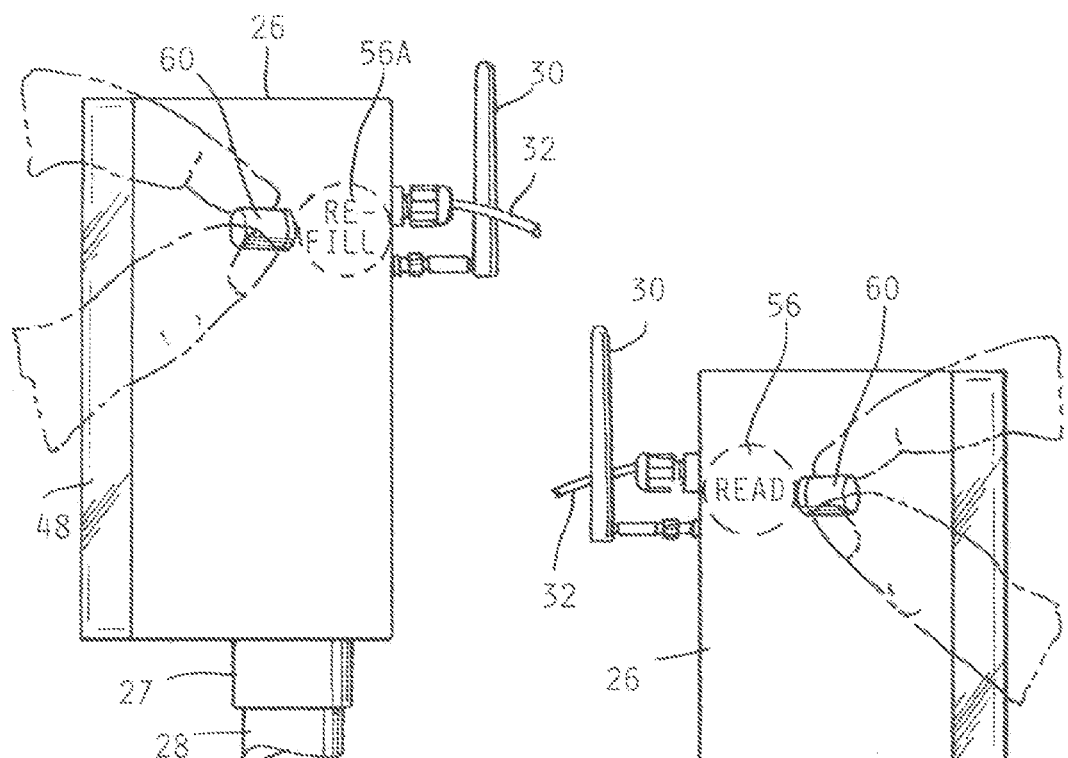
FIG. 3B
FIG. 3A
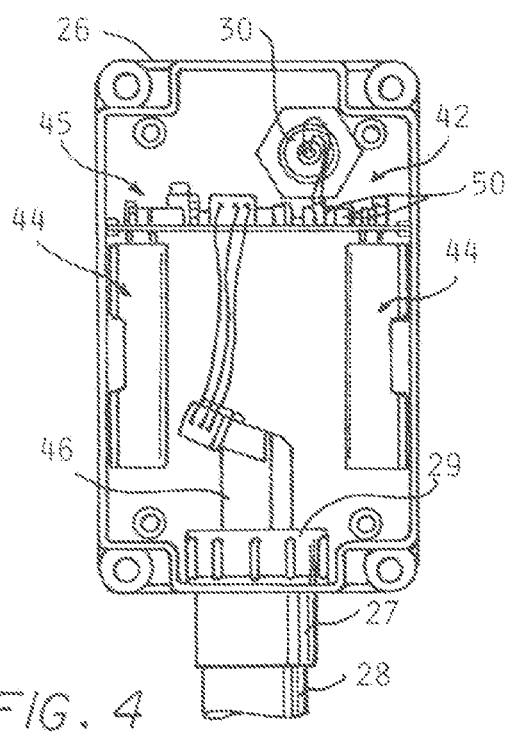
FIG. 4
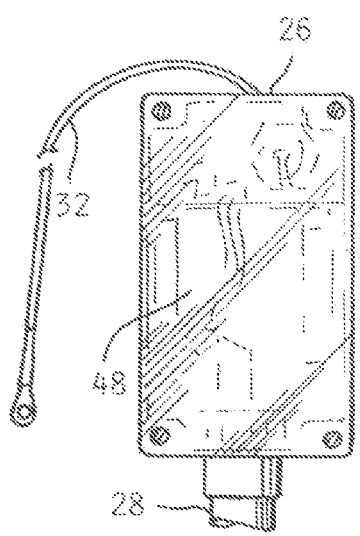
FIG. 5

CAR WASH CHEMICAL SOLUTION LEVEL MONITORING SYSTEM

CROSS REFERENCE TO RELATED PATENT APPLICATIONS

This application claims the benefit of U.S. provisional application No. 61/839,520 filed on Jun. 26, 2013.

BACKGROUND OF THE INVENTION

This invention concerns monitoring the level of chemical solutions stored in containers such as drums, and in particular various cleaning agents used in automatic car wash systems.

In automatic car washes, cars are advanced through a carwash "tunnel" by a conveyor and various cleaning and related operations are performed at locations along the tunnel by equipment mounted to arches and other supports. A tunnel control activates the various pieces of washing equipment as the car is moved along the tunnel.

A number of chemicals in water solutions are applied during the washing process, such as presoaks, wheel rim cleaners, soaps, foaming detergents, waxes in several colors, drying sealer waxes, rain coats, etc.

Typically, not every car will have every chemical solution applied as some cleaning or treating steps are only optionally offered to the customer.

As noted, the various chemical solutions are stored in containers, typically drums or tanks, and an associated mixing/dispensing apparatus draws out a predetermined chemical solution, mixes it with water in a mixing tank to further dilute the same. The diluted solution is then pumped to nozzles or other applicators along the car wash tunnel to be applied if the tunnel control calls for application of that solution on a particular car being conveyed through the tunnel.

Keeping the drums supplied with the chemical solutions is a constant need, and in the past, it has been proposed to monitor the chemical level with sensors connected to a display with wiring, so that staff personnel can view the fill state of each drum conveniently at a central location.

However, the extensive wiring required presents a challenge to keep the installation costs low enough to be practical for a car wash business which typically operates on a tight budget.

In addition, various malfunctions are sometimes presented, requiring proper attention of car wash or supplier personnel, to maintain an effective monitoring system after its installation.

This includes malfunctioning sensors due to the presence of contamination, mispositioning of the liquid level sensors, failure of various components, leaks in the plumbing, wiring defects, etc.

As noted, the chemical solutions in the drums need to be replenished periodically and any automated system must preferably not require extensive plumbing and wiring, nor extensive disassembly or reassembly steps.

Sensors for monitoring the fill state of each drum should therefore easily be installed and should reliably monitor the state of each drum.

It is an object of the present invention is to provide a sensor and system for reliably monitoring the fill state of a number of drums for an automatic car wash which can be installed without requiring extensive wiring or assembly steps to install or extensive maintenance to keep in good operating order.

It is a further object of the present invention to provide a self-contained quickly installable level sensor probe for use in maintaining automatic car wash chemical solution levels in storage containers such as drums.

SUMMARY OF THE INVENTION

The above recited objects and other objects which will be understood by one skilled in the art are achieved by a system which includes liquid level sensor probes each comprised of a elongated clear tube of a length able to reach a point adjacent the bottom of the storage containers such as drums when inserted through a hole in the top of the drum, the tube supporting a sealed enclosure at the top end which is thereby located a short distance above the top of an associated drum.

The enclosure houses various electronic components including a sonar sensor at the top of the tube able to direct ultrasonic waves down the tube towards the liquid contained in the tube, the chemical solution in the tube assuming the same level as in the remainder of the drum. Return waves receive reflected from the liquid in the tube are detected at a time determined by the sensor, and the level being calculated by processor from this data.

According to the present invention, any of several common defects in the level sensors are detected by an analysis carried out by the electronic processor housed within the enclosure. These defects include a disconnected level sensor, a defective level sensor, a sensor out of the drum and a contaminated sensor tube alarm displays alert support personnel of the problem.

The enclosure also houses a microprocessor which is programmed to carry out the electronic processing references above, which also carries out the liquid level measuring analysis, and other functions including operation of a wireless transmitter/receiver, associated circuits, for conditioning of a battery power source to operate the electrical components and devices, a vehicle counter circuit, tank identification, date and time stamps and a temperature sensor.

A read and refill switch operated by the use of an external hand held magnet allows a reset of the level sensing process after the drum is refilled and a display of the drum level data whenever activated by the magnet. LED warning/function indicators are able to be seen through a clear cover on the front side of the enclosure.

A wireless transmitter/receiver antenna is mounted on the exterior of enclosure, and an electrical lead for a car counter passes through the enclosure and is associated with a magnetic sensor located next to a solenoid valve in a mixer/dispenser into which the chemical solution in the drum is drawn, mixed with water and the dispensed from nozzles or other chemical solution applicators in the car wash tunnel.

The data generated relative to the level of liquid and the state of the sensor components is wirelessly transmitted to a computer/display/server where it is available to be seen.

The same data may be transmitted from the computer/display/server via the internet to a website allowing offsite reference of the state of all of the drums associated with an automatic car wash.

The computer/display can utilize the data to generate reports and analysis of the data, such as usage, costs, at regular intervals and generate alerts therefrom for leaks, low/high drum liquid levels, under/over usages of the anomalies in liquid level changes, and other conditions needing attention.

DESCRIPTION OF THE DRAWINGS

FIG. 2 is an enlarged pictorial view of a typical container drum with an associated mixer/dispenser, a wirelessly connected computer/display/server and a fragmentary portion of a car wash tunnel arch component.

FIG. 3 is a pictorial view of a sensor probe tube with the electronics enclosure mounted thereto.

FIGS. 3A and 3B are right and left enlarged side views of the electronics enclosure portion mounted to the sensor tube shown in FIG. 3.

FIG. 4 is an enlarged front view of the electronics enclosure with the transparent cover removed to show the various components housed therein.

FIG. 5 shows the electronics enclosure with the cover installed and the associated car counter sensor and lead.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
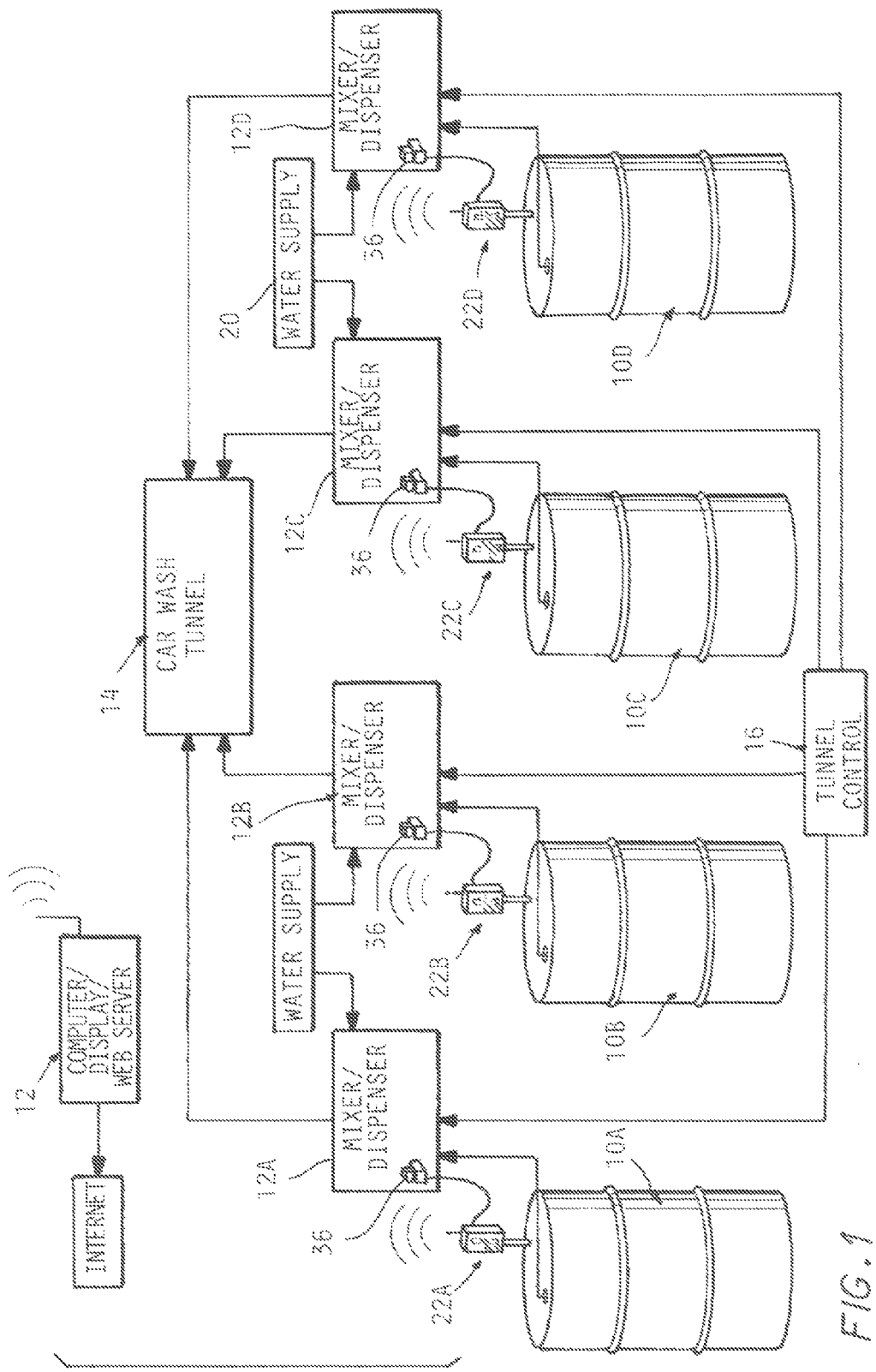
FIG. 1 is a diagrammatic depiction of an automatic car wash connected to an array of storage containers and associated liquid level sensors connected to mixer/dispensers, and a computer/display/server wirelessly receiving and displaying the same information generated.

Referring to FIG. 1, a series of four chemical solution storage containers such as tanks or drums 10A-10D are shown which each supply a particular chemical solution to a respective mixer/dispenser 12A-12D associated with a particular applicator in the car wash tunnel.

The mixer/dispensers 12A-12D each supply chemical solutions to applicator equipment located along a car wash tunnel 14 when activated under the control of a tunnel control 16.

The chemical solution from each drum 10A-10D is drawn into the mixing associated mixer/dispenser 12A-12D via piping 18 and mixed therein with additional water from a water supply 20. Discharge of a diluted volume of chemical solution on to a car is carried out by a particular applicator equipment such as spray jets (not shown) in the car wash tunnel 14.

This is a conventional arrangement in very widespread use in the automatic car wash industry.

According to the present invention, a self-contained liquid level sensor probe 22A-22D is simply inserted into a matched hole formed in the top of a respective drum 10A-10D without any mountings or wiring or plumbing connections necessary, except to the very limited extent described below.

As will be described further herein, each of the self-contained liquid level sensor probes 22A-22D has an enclosure 26 mounted to the top of a clear plastic tube 28, the enclosures each containing the associated electronics and sensors for carrying out the liquid level determinations of the associated drum 10A-10D, a wireless transmitter/receiver 42 for sending data to a computer/display/server 24, and a battery power source 44 for powering these components to substantially eliminate wiring or other extensive hook ups when the sensor probes 22A-22D are installed.

The only openings in the watertight enclosure 26 include one at the bottom to receive the sensor tube 28, which is long enough to reach a point adjacent the bottom of the associated container drum 10, and to support the enclosure 26 at a point space a short distance above the top of the container drum 10.

An antenna 30 for the wireless transmitter is also connected through an opening in a back wall of the enclosure 26.

Additionally, an electrical lead 32 passes out of the enclosure 26 to a sensor 34 which is mounted next to a solenoid 36 included in the associated mixer/dispenser 12A-12D (FIG. 2), which is activated by the tunnel control to start a pump 41 when application of the chemical solution is called for to cause a flow of diluted chemical solution from a mixing tank 38 into a connected applicator in the car wash tunnel 14.

A volume of the chemical solution in each drum 10A-10D is drawn into the associated mixing tank 38 via a line 18 as by an inductor 40 and water from a pressurized water supply 37 is also mixed to further dilute the chemical solution.

FIG. 3 shows the interior of the enclosure 26 with a transparent cover 48 removed, showing a wireless transmitter/receiver 42, a circuit board 45, battery power packs 44 and ultra sonar sensor 46 are mounted therein.

The ultrasonic sensor 46 is affixed to the top of the sensor probe tube 28 which in turn is affixed to enclosure 26 by watertight fittings 27, 29 so as to be able to direct pulses of sonic waves down the tube 28 to the level of the liquid therein from which they are reflected.

The enclosure 26 normally has the front cover 48 installed, but since the cover 48 is transparent, LED indicator lights 50 in the enclosure 26 may be observed without the necessity of having any opening in the enclosure 26 or cover 48 to externally mount the LED's.

Thus, the possibility of water leakage into the enclosure 26 is minimized, an important advantage in the wet environment of an automatic car wash.

The clear sensor probe tube 28 allows easy drop in installation into various sizes and shapes of drums 10, and easy detection of any debris that might collect in the sensor tube 28 and interfere with the level measurement process. The sensor tube completely encloses the liquid therein to prevent the drying of any chemical on the inside of the sensor probe tube 28 and thus minimizes the need for cleaning of the tubes 28.

The closed chamber provided by the sensor probe tube 28 also minimizes false liquid level determinations from the effects of wind, condensation, debris, etc.

The circuit board 42 includes magnetically operated switches 52, 54 (depicted in FIG. 6) adjacent opposite sides of the enclosure 26, switch 52 when activated causing a reset to start when a drum 10 is refilled, and switch 54 when activated causing a reading of the data concerning the state of the associated tank to be displayed whenever desired without waiting for the next periodic reading/display of the level of chemical solution in the associated drum 10. Switch activation is accomplished by simply placing a magnet 60 against respective areas 56A, 56B of the enclosure exterior where the respective switches 52, 54 are positioned within the enclosure (FIGS. 3A, 3B).

Figure 6:
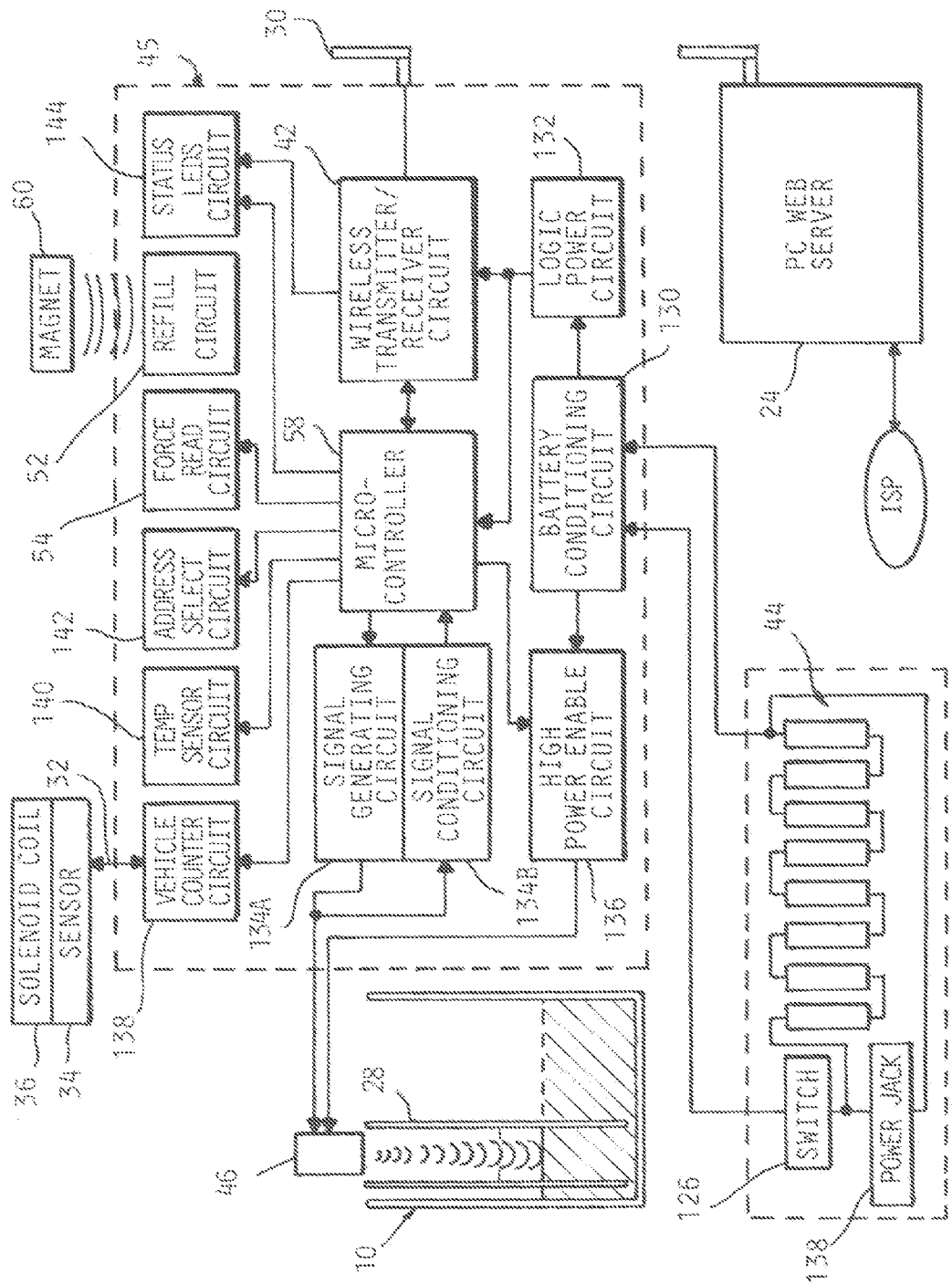
FIG. 6 is a block diagrammatic representation of the electronic circuitry contained in the electronic enclosure on the liquid level sensor tube.

Referring to FIG. 6, the components housed within the enclosure 26 are depicted in block diagrammatic form along with a diagram of a container 10, and liquid level sensor 46 in operation.

A microcontroller 58 is suitably programmed to operate the various components as described below.

The liquid level sensor 46 is of a well known ultrasonic sonar type, which generates and sends out a train of sonic waves down the interior of the sensor tube 28. The waves reflect back from the liquid in the sensor tube 28, which is suitably positioned so as to have therein the chemical solution at the same level as the level of the chemical solution in the drum 10 as shown.

From the time elapsed data for the reflected waves to reach the sensor 46, the distance to the liquid is computed in the well known manner, that distance indicating the level of liquid in the sensor tube 28 and the drum 10 itself.

In order to make the operation of the sensor 46 more reliable and accurate several potential problems occurring on occasion and causing errors are detected and signals generated such as to set off alarms to alert service personnel of their existence.

These problems include a disconnected level sensor, a defective level sensor, a sensor positioned out of its drum, and a contaminated sensor tube or the presence of a significant level of foam in the sensor tube.

Figure 7:
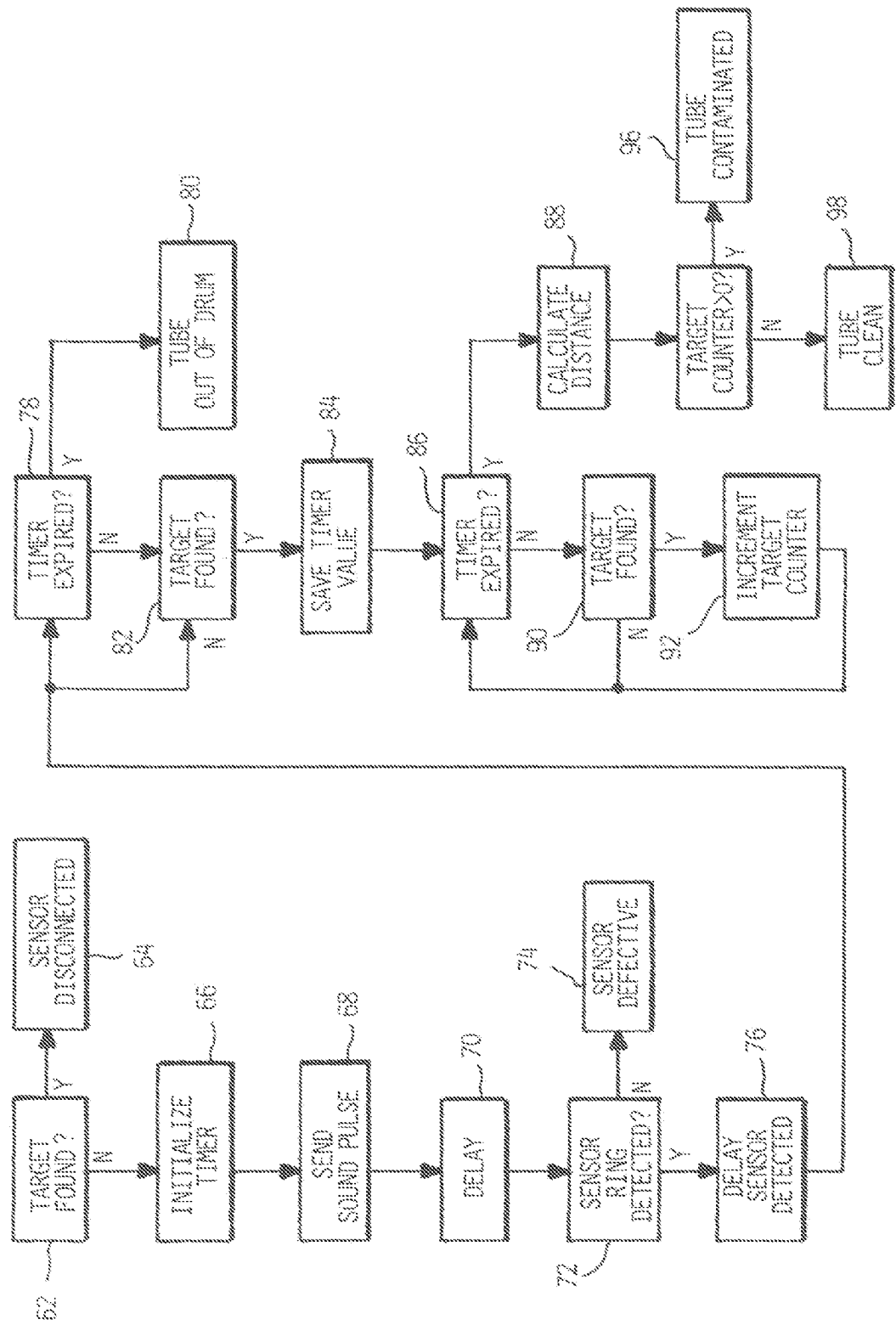
FIG. 7 is a flow chart showing the microprocessor programming used to carry out the signal processing with associated electronic circuitry to detect common probe sensor defects.

The flow chart of FIG. 7 depicts how the existence of each of these conditions are detected upon initiating a level reading.

Firstly, if a target is found even before the sonic waves are generated, the sensor is wired such that an indication of the presence of a target before sensing begins, then the sensor 46 is not connected.

That is, if at initial start up of a periodic measurement cycle, a target is immediately indicated by the sensor 46, as indicated in block 62, i.e., before any sonic waves are generated, this means that the sensor 46 is not connected properly and a corresponding error message is generated, (block 64).

After that initial check, a timer is started block (66) which generates sonic pluses directed down the length of the sensor probe tube 28 (block 68).

After a short delay (block 70), the existence of sensor "ring" is searched. That is, continued pulsing normally occur for a brief period when a pulse train is generated.

If this "ring" is not detected (block 72), the sensor 46 is defective and a corresponding error message is generated at (block 74).

If the ring is detected, the next step, after a short dead zone delay present in every sensor set up expires (block 76) to determine if a return signal or target is found before the timer expires (78). If the set interval timer expired, and no return signal has been detected, this means the sensor 46 is out of the drum 10, and a corresponding error message is generated (block 80).

If a target is found before the timer expires (block 82), the process continues and the timer value at the time when the target is found is saved (block 84).

If the timer is expired (block 86), the distance of the liquid level is calculated (block 88).

If the timer is not expired, and an additional target is found (block 90), the number of additional targets found is counted (92), repeating until the timer is expired.

If the additional target count is greater than 0 (block 94), this means that one or more return signals has been generated by excessive foam or the presence of a solid contaminant, and a corresponding error message is generated.

Figure 8:
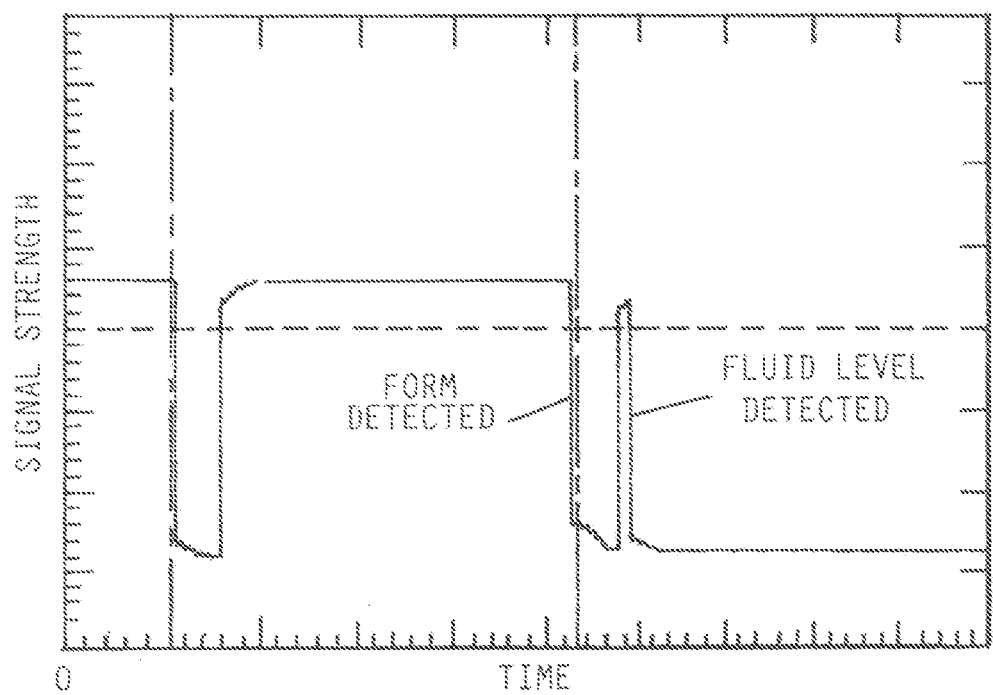
FIG. 8 is a plot of signals generated by the level sensor when contamination of the sensor probe tube is present to enable detect of such contamination.
Figure 9:
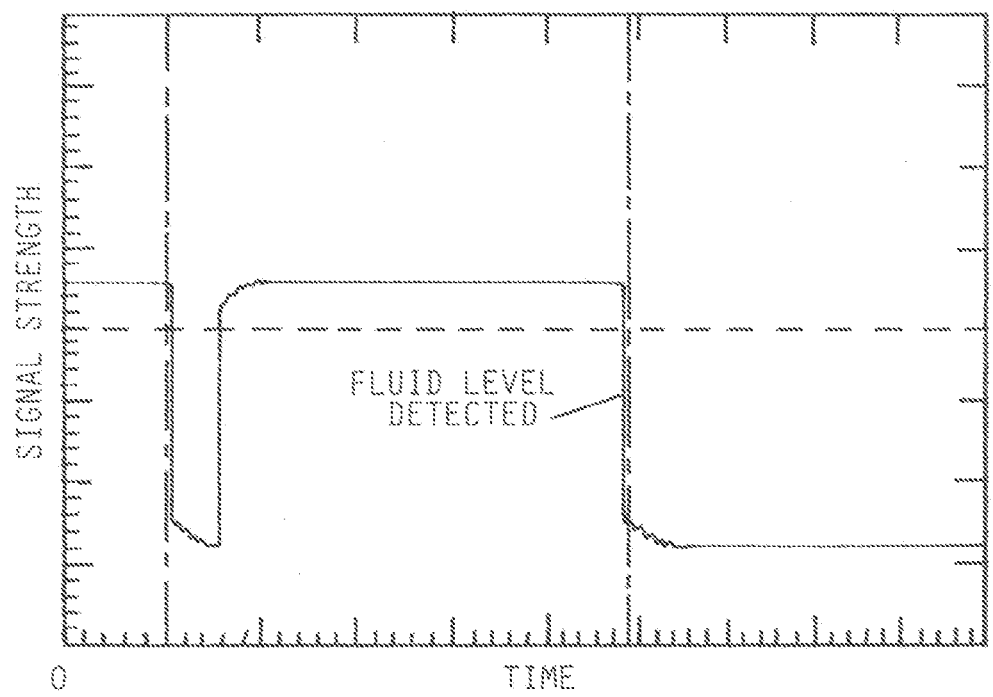
FIG. 9 is a plot of signals when a level determination is carried out without the presence of a solid contaminant or excessive foam in a sensor probe tube.

This is seen in FIGS. 8 and 9 where an additional return is detected, caused by the presence of a solid contaminate or substantial layer of foam in the sensor probe tube 28, (FIG. 8) only one return signal is created when the tube is clear (98) (FIG. 9).

Additional system anomalies can occur, i.e., drum filing with water diverting from water supply, drum draining siphoning, chemical usage not corrected, usage rate not correct, low battery, temperature outside limits—ambient, disconnected level sensor, sensor out of drum, contaminated sensor tube foam in sensor tube.

Figure 7A:
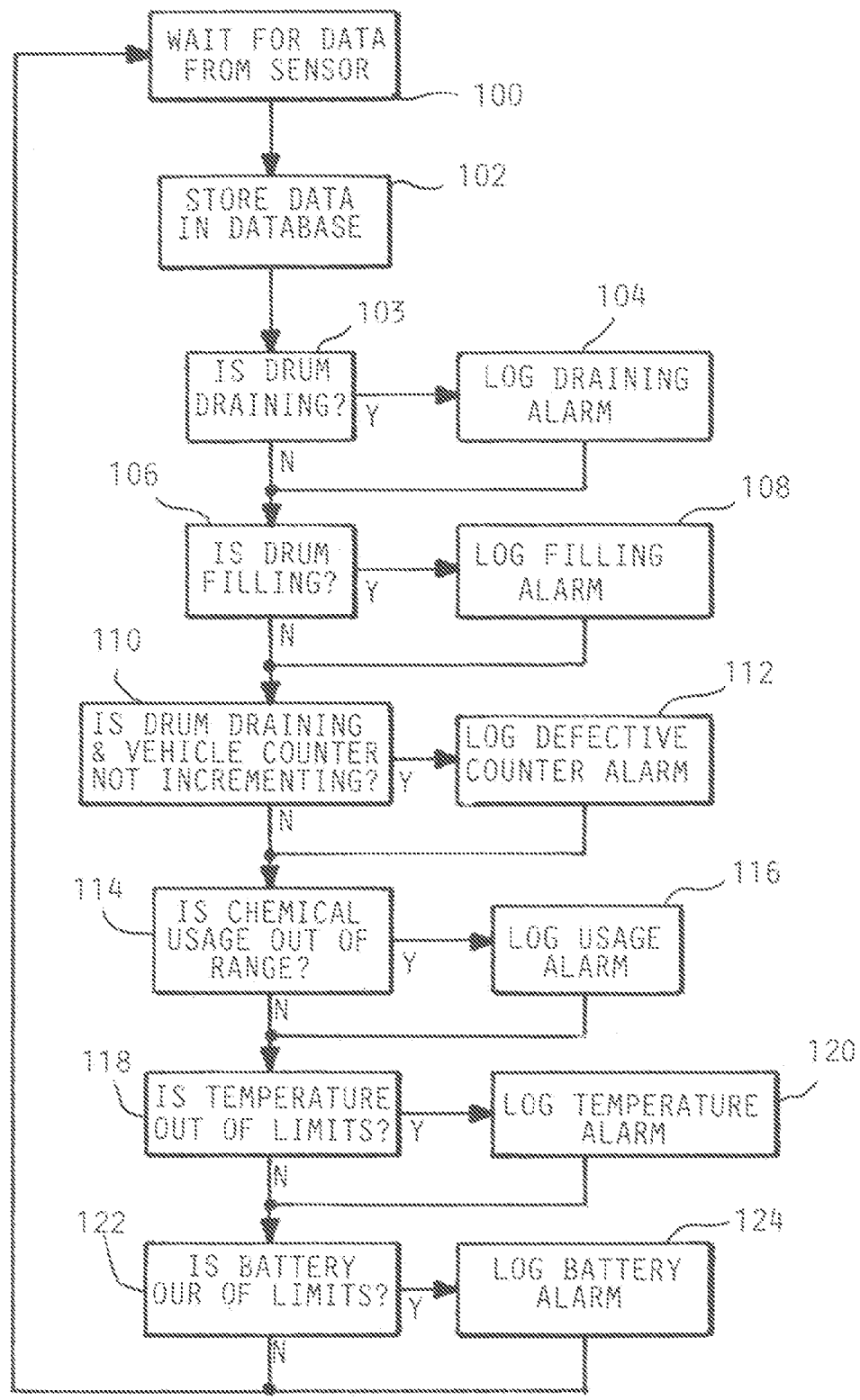
FIG. 7A is a flow chart depicting data analysis for detection of conditions which are anomalies.

Analysis of the data generated can detect these conditions, as indicated in FIG. 7A.

The data is collected (block 100) and stored (block 102).

If in successive cycles, the level of liquid has declined to a greater degree than what corresponds to the volume of solution which should have been applied, as determined by data analysis; this detects an unprogrammed draining of a drum (103) can be caused by an unwanted siphoning water out of the drum or from some leak; a corresponding error signal is generated (block 104).

If not, if the drum is filing (block 106) water from the water supply entering the drum due to some condition in the plumbing.

If so, corresponding alarm display is generated (block 108).

If the drum 10 is draining, but in correspondence with expected amount, but the vehicle counter count does not increase (block 110) then the counter is defective and a corresponding alarm display is generated (block 112).

Then if the chemical solution usage calculated is out of the normal range (block 114) then a corresponding alarm display is generated (block 116).

If the sensed temperature is out of the preset operating range (block 118), a corresponding alarm/display is generated (block 120).

Finally, if the sensed battery power voltage declines to an unacceptable degree (122), then a corresponding alarm/display is generated (block 124).

These analyses can be carried out by the microprocessor 58.

Referring again to FIG. 6, other circuits can be included on the circuit board 42.

The battery power source 44 may have a power switch 126 and power jack 128 for connection to an external power source (not shown).

A battery conditioning circuit 130 saves power by turning off all power when the liquid level is not being measured which takes place only at intervals (typically every hour). The battery power is divided into high power for use with the sensor 46 by a high power enable circuit 136, and low power for use in the rest of the circuitry by a logic power circuit 132.

The signals to the sensor 46 are generated and conditioned by a signal generating circuit 134A and signal conditioning circuit 134B.

A vehicle counter circuit 138, temperature sensor circuit 140, and an address select circuit 142, are operated by software program of the microprocessor 58.

An LED status circuit 144 is connected to the microprocessor 58 and wireless transmitter/receiver 42.

The computer/display/web server 24 has an antenna sending/receiving to the wireless transmitter/receiver 25. The computer/display/server 24 allows review of the readings and alarms, etc. remotely by accessing a website where all of the displays and alarms are uploaded via the internet to enable remote access.

The invention claimed is:

1. A chemical solution liquid level probe for measuring the level of a chemical solution stored in storage containers located in a wet environment adjacent to an automated car wash, comprising:
   an elongated drop in tube of a length able to reach a point adjacent the bottom of a container when inserted in a hole in a top of said container to thereby be supported by said tube with a section of said tube protruding above said top of said container, the bottom of each tube allowing entry of liquid in said associated container into said tube so as to thereby fill the tube to the same level as existing in the associated container;
   a sealed water tight enclosure mounted to said protruding section of said tube to a top end of said tube, said enclosure containing a liquid level sensor mounted in said enclosure and arranged to emit sonic waves down into said tube and to sense the timing of return waves reflected from liquid in said tube corresponding to the liquid level in said container;
   an electronic processor in said sealed enclosure storing and analyzing said sensor signals to periodically calculate the level of liquid in said storage container from the timing of sensed return waves, and to determine malfunctions of said sensor;
   a wireless transmitter/receiver in said enclosure for transmitting data from the liquid level sensor to a remote signal storage analysis and display device;
   a battery power source in said sealed enclosure powering said sensor therein, said wireless transmitter/receiver, and said electronic processor.

2. The liquid level probe according to claim 1 wherein said tube is transparent to enable visual detection of the presence of contamination therein.

3. The liquid level probe according to claim 1 wherein said sealed enclosure has a transparent cover and wherein one or more LED lights are mounted within said enclosure and are activated as alerts of abnormal conditions detected by said electronic processor, which LED's are visible through said enclosure transparent enclosure cover, whereby the need for any LED's mounted outside and for an opening for connecting wires to said outside located LED's is eliminated.

4. The liquid level probe according to claim 1 wherein an electrical lead extends from within said sealed enclosure to a magnetic sensor associated with a solenoid valve in a mixer/dispenser for said chemical solution to thereby provide a signal corresponding to a washed vehicle count to said electronic processor.

5. The liquid level probe according to claim 1 wherein said electronic processor determines from said analysis of said return signals when more than one return signal occurs within a single time period, thereby enabling detection of contamination of said sensor tube.

6. The liquid level dispenser according to claim 1 wherein an antenna is mounted to said enclosure and connected to said wireless transmitter/receiver in said enclosure.

7. The liquid level probe according to claim 1 wherein said signal processor includes switches located within said enclosure able to be activated by placing a magnet against a region of an exterior surface of said enclosure resetting sensing said process when a container associated with said probe is refilled.

8. The liquid level probe according to claim 7 wherein said electronic processor further includes a second switch causing generations of an updated level signal upon activation by a magnet placed against another region of an exterior surface of said enclosure.

9. The liquid level probe according to claim 1 further including a temperature sensor in said enclosure connected to said electronic processor and utilized to adjust said level determination to reflect the effects of temperature on the determination of said liquid level.

10. The liquid level probe according to claim 1 wherein said electronic processor establishes high and low battery power outputs for use in powering said liquid level sensor and said electronic processor with said wireless transmitter/receiver respectively.

11. The liquid level probe according to claim 10 wherein said battery power source is disconnected by said electronic processor when a low battery voltage is detected.

12. In combination the liquid level sensor according to claim 1 and a remote combined computer display having a wireless transmitter/receiver receiving data streamed from said sensor probe wireless transmitter/receiver.

13. The combination according to claim 12 wherein said computer/display comprises a server for a website which also receives said data streamed from said sensor probe wireless transmitter/receiver.

14. The combination according to claim 12 wherein said sensor probe electronic processor determines a disconnected or defective level sensor, a sensor out of said container, and from the presence of an additional return wave foam in said sensor tube.

15. The combination of claim 12 wherein said electronic processor also determines from analysis of sensor signals any occurrence of an increase in sensed liquid level in said container or, a constantly decreasing sensed liquid level in said container, and generates a corresponding alarm signal upon development either of said sensed changing level conditions and transmits said alarm signal to said wireless transmitter/receiver which transmits said alarm signal to said computer/display for display thereof.

* * * * *